(12) United States Patent
Büchel (10) Patent No.: US 9,074,884 B2
(45) Date of Patent: Jul. 7, 2015

(54) ELECTRO-OPTICAL DISTANCE MEASURING DEVICE WITH A GESTURE-BASED MEASUREMENT TRIGGER THAT FUNCTIONS WITHOUT CONTACTING THE MEASURING DEVICE

(75) Inventor: Sven Büchel, Widnau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 5 days.

(21) Appl. No.: 13/985,061

(22) PCT Filed: Mar. 22, 2012

(86) PCT No.: PCT/EP2012/055154
§ 371 (c)(1),
(2), (4) Date: Aug. 13, 2013

(87) PCT Pub. No.: WO2012/127017
PCT Pub. Date: Sep. 27, 2012

(65) Prior Publication Data
US 2014/0002806 A1    Jan. 2, 2014

(30) Foreign Application Priority Data

Mar. 22, 2011 (EP) .................................. 11159282

(51) Int. Cl.
*G01C 3/08* (2006.01)
*G01C 3/02* (2006.01)
(Continued)

(52) U.S. Cl.
CPC ... *G01C 3/02* (2013.01); *G01S 7/48* (2013.01); *G01S 7/497* (2013.01); *G01S 17/023* (2013.01); *G01S 17/08* (2013.01)

(58) Field of Classification Search
CPC ........ G01C 3/08; G01C 15/002; G01S 17/89; G01S 7/4817; G01S 17/42

USPC .......................... 356/3.01, 4.01, 4.07, 5.01, 9
See application file for complete search history.

(56) References Cited

U.S. PATENT DOCUMENTS

| | | | |
|---|---|---|---|
| 4,688,939 A * | 8/1987 | Ray ............................ | 356/237.5 |
| 7,023,564 B2 * | 4/2006 | Jagiella et al. ................ | 356/614 |

(Continued)

FOREIGN PATENT DOCUMENTS

| | | |
|---|---|---|
| CN | 101119680 B | 6/2012 |
| DE | 10 2006 041 077 A1 | 3/2008 |

(Continued)

OTHER PUBLICATIONS

European Search Report dated May 10, 2011 as received in Application No. EP 11 15 9282.

*Primary Examiner* — Luke Ratcliffe
*Assistant Examiner* — Samantha K Abraham
(74) *Attorney, Agent, or Firm* — Maschoff Brennan (57) ABSTRACT

An electro-optical distance measuring device. Criteria are defined and stored which characterize a determined gesture for triggering the distance measurement, said gesture being carried out by a user using a test body that crosses the measuring light beam in an encoded manner. The analyzing and control unit is designed to carry out a measurement-triggering gesture mode in which reflected portions of the optical measuring light beam are continuously detected automatically and the continuously detected reflected portions are analyzed with respect to characteristic variables, the variables being dependent on a gesture that crosses the measuring light beam by means of a test body in an encoded manner. The characteristic variables are used to test whether the variables correspond to the defined criteria so that the gesture that is carried out by the user is identified as the gesture for triggering the distance measurement if the characteristic variables correspond to the criteria.

20 Claims, 6 Drawing Sheets (51) Int. Cl.
    *G01S 7/48*     (2006.01)
    *G01S 7/497*     (2006.01)
    *G01S 17/02*     (2006.01)
    *G01S 17/08*     (2006.01)

(56) References Cited

U.S. PATENT DOCUMENTS

| | | |
|---|---|---|
| 7,835,498 B2 | 11/2010 | Bonfiglio et al. |
| 8,780,334 B1 * | 7/2014 | De Groot .................... 356/28.5 |
| 2006/0132802 A1 * | 6/2006 | Chung et al. .................. 356/603 |
| 2006/0256007 A1 * | 11/2006 | Rosenberg ............... 342/357.08 |
| 2007/0083896 A1 * | 4/2007 | Staples .......................... 725/58 |
| 2007/0206174 A1 | 9/2007 | Boegel et al. |
| 2009/0204917 A1 | 8/2009 | Skultety-Betz |

FOREIGN PATENT DOCUMENTS

| | | |
|---|---|---|
| EP | 1 566 658 A1 | 8/2005 |
| WO | 2005/083465 A1 | 9/2005 |

* cited by examiner

ELECTRO-OPTICAL DISTANCE MEASURING DEVICE WITH A GESTURE-BASED MEASUREMENT TRIGGER THAT FUNCTIONS WITHOUT CONTACTING THE MEASURING DEVICE

FIELD OF THE INVENTION

The invention relates to an electro-optical distance measuring device, in particular a handheld laser distance measuring device, for distance measurement, a distance measurement method with such a distance measuring device, and a computer program product, a distance measurement being triggered within the context of the invention when a stipulated gesture executed with the aid of a test body within a defined closed range around the distance measuring device is detected and identified as such.

BACKGROUND

Generic electro-optical measuring devices, in particular handheld laser distance measuring devices, such as described, for example, in WO 2005/083465, for the optical measurement of distances have been known for years and are currently used in large numbers for the most variant applications, particularly in the construction industry. They can be used for the optical measurement of distances, for example between a measurement stop of the measuring device and a surface region of an object within a distance measurement range from a few decimeters up to, for example, 30 meters with an accuracy of a few millimeters. In this case, in a conventional embodiment of such a measuring device, optical beams modulated via an optics are emitted as transmitted beams or measuring light beams to the object to be measured. At least a portion of the measuring light beams is retroreflected from the surface region of the object in the direction of the measuring device. Beams reflected from the surface region (particularly, in a fashion spaced apart from the transmitted beams) are collected again via the optics and converted into an electric signal by a receiver of the device.

Such known electro-optical measuring devices and distance measurement devices are based on a measurement of the propagation time of a temporal light pulse, or a measurement of the phase shift of a laser beam reflected from the object.

During measurement of the propagation time, the pulse propagation time from the laser light source to the object and back from the laser to a receiver is measured. An advantage of this embodiment is the extremely short measuring time required. Disadvantageous is the correspondingly required very high time resolution of the light pulse detection in the nanosecond or even picosecond range, something which makes high demands on the detection technology, in order to measure distances with a resolution in the centimeter or even millimeter range.

Electro-optical measuring devices and distance measurement methods based on measurement of the phase of the reflected laser light are based on the fact that the phase shift in the reflected laser beam, or the modulation thereof in comparison with the emitted beam is a function of distance. Typically, a frequency modulation of the laser light amplitude is carried out, and the phase angle of the signals modulated thereon is evaluated.

An advantage of this second variant of the measurement method is a higher achievable resolution of the distance measurement in comparison with the propagation time method in conjunction with a comparable outlay on metrology.

A disadvantage of this second variant is based on a lack of uniqueness in the measurement in the case of distances and/or resulting phase shifts of a multiple of half the laser or modulation wavelength. This ambiguity can be canceled by taking measurements at different laser wavelengths and/or modulation frequencies, but this increases the measuring time. This solution is widely used in commercially available laser distance measuring devices.

Known electro-optical distance measuring devices, in particular handheld laser distance measuring devices, have in common that the resolution of the measurement of the distance relating to a targeted point in space is typically served by a key on the measuring device that is to be actuated by a user, or served by a field to be marked by touching on a touchscreen as the display of the device.

Given such an operation for triggering the measurement by a mechanical command input, unintended adjustment of the measuring device from an originally provided targeting direction can easily come about, with the consequence that the alignment of the laser beam is significantly shifted away from a previously targeted point in space as a function of distance, for example of the order of magnitude of several centimeters, the result being inaccurate measurement results, in particular in the case of measurements over long distances.

A known alternative is remote triggers, for example cable remote triggers or infrared/Bluetooth remote triggers (compare the mechanical wire release known for over a century in the field of photography), with the aid of which it is possible to trigger a measurement without needing to touch the device directly at all. However, it is disadvantageous in this case and complicated (with regard both to operability and to technical and/or design features) that this requires a separate remote triggering device connected to the actual measuring device (mechanically and/or electronically), and this always also needs to be carried along and operated by the user during a measurement task.

SUMMARY

It is an object of the present invention to provide an improved electro-optical distance measuring device, in particular a handheld laser distance measuring device and an associated measurement method with the aid of which the abovementioned problems and disadvantages in the triggering of the measurement operation can be reduced and/or avoided.

In particular, the aim hereby is to enable a triggering of a measurement which can be operated in a fashion that is as user friendly and intuitive as possible, both without this requiring the measuring device itself to be touched, and without the need for the assistance of an additional separate remote triggering device.

This object is achieved by implementing the characterizing features of the independent claims. Features developing the invention in an alternative way or advantageously are to be gathered from the dependent patent claims.

The invention relates to an electro-optical distance measuring device, in particular one designed as a handheld laser distance measuring device, for contactless distance measurement, comprising at least a laser distance measuring module that has a laser source for emitting an optical measuring light beam in the direction of an object, and a receiver for detecting reflected components of the optical measuring light beam, and an evaluation and control unit for determining a distance on the basis of the received components of the optical measuring light beam.

In this case, according to the invention criteria are defined and stored which are such as to characterize a stipulated distance measurement triggering gesture made by a user to cross the measuring light beam in an encoded fashion with the aid of a test body. In addition, according to the invention the evaluation and control unit is designed to execute such a gesture measurement triggering mode in which the detection of reflected components of the optical measuring light beam is performed automatically and continuously at a defined minimum rate by the receiver, and the evaluation and control unit automatically

- evaluates the continuously detected reflected components of the optical measuring light beam with regards to parameters that are dependent on a gesture crossing the measuring light beam in an encoded fashion with the aid of the test body,
- uses the parameters to check whether these correspond to the defined criteria and, in the event of correspondence with the criteria, the gesture made by the user is identified as the distance measurement triggering gesture, and
- triggers a distance measurement relating to the object in response to an identification of the distance measurement triggering gesture.

Furthermore, in accordance with a development of the invention the evaluation and control unit can be designed to execute the gesture measurement triggering mode in such a way that whether the criteria are fulfilled is checked as a function of a profile of an intensity, and/or of a profile of a change in intensity of continuously detected reflected components of the optical measuring light beam, specifically whether the criteria are fulfilled being checked as a function of

- a period during which the intensity lies within a defined intensity window,
- a sequence of changes in intensity as edges detectable in the intensity profile, and/or
- a number of change in intensity as edges detectable in the intensity profile.

Furthermore, in accordance with a development of the invention the evaluation and control unit can be designed to execute the gesture measurement triggering mode in such a way that with the aid of the continuously detected reflected components of the optical measuring light beam the evaluation and control unit automatically determines a sequence of test body distances relating to the test body crossing the measuring light beam, and whether the criteria are fulfilled is checked with the aid of the sequence of test body distances—used at least pro rata as the parameters—, in particular whether the criteria are fulfilled being checked as a function of

- a period during which a group of directly sequential test body distances from the sequence of test body distances lie within a defined distance range,
- a sequence of changes in respective test body distances among one another from the sequence as edges detectable in the sequence of test body distances, and/or
- a number of changes, identifiable as decisive, in test body distances from the sequence as edges detectable in the profile of the continuously determined test body distances.

In this case, it is also specifically possible to design the evaluation and control unit to execute the gesture measurement triggering mode in such a way that—compared with a measurement mode in which precise determination of the distance relating to the object is performed after measurement triggering—the test body distances of the sequence of test body distances are determined with relatively low accuracy, but in return continuously with a relatively high repetition rate.

Altogether within the context of the invention it can then follow in response to an identification of the distance measurement triggering gesture (as described previously, and also in more detail below) a distance measurement relating to the object is automatically triggered and carried out by the evaluation and control unit, in particular—for example in a standard mode—the actual distance measurement relating to the object is performed with a delay of approximately between a quarter and a whole second, specifically with a delay of approximately half a second, after the identification of the distance measurement triggering gesture.

In a triggering delay mode (similar to the self release functionality known from the field of photography), which can be provided alternately or in addition to the standard mode, in response to the identification of the distance measurement triggering gesture it is, however, possible for the actual distance measurement also to be triggered and carried out automatically only given a defined time delay of between five and fifteen seconds.

Here, in this gesture measurement triggering mode provided according to the invention the evaluation and control unit functions together with the laser distance measuring module as a gesture detector (or these components—at least partially—form the gesture detector).

The gesture detector therefore has a test signal wave transmitter for emitting test signal waves, and a test signal wave receiver for detecting reflected components of the test signal waves, the test signal wave transmitter and the test signal wave receiver being respectively identical in this case to the laser beam source and the receiver of the laser distance measuring module. At least when the gesture measurement triggering mode is switched on, a detection of reflected components of the test signal waves is then performed in this case continuously at a defined minimum rate, and it is checked with the aid of the continuously detected components, used at least pro rata as the parameters, whether the criteria are fulfilled. In particular, it is possible to check as a function of a profile of the intensity and/or of a profile of the change in intensity of the continuously detected reflected components whether the criteria are fulfilled, specifically to check whether the criteria are fulfilled as a function of a period during which the intensity lies within a defined intensity window.

In accordance with a specific embodiment, the gesture detector—that is to say, thus, the evaluation and control unit together with the laser distance measuring module when these operate together in the provided gesture measurement triggering mode—can be designed to determine test body distances relating to the test body guided by the user, which executes a movement intersecting with/crossing the measuring light beam. Once again, when the gesture measurement triggering mode is switched on it is then possible to perform a continuous determination of test body distances at a defined minimum rate, and to check whether the criteria are fulfilled with the aid of a profile of the continuously determined test body distances used at least pro rate as the parameters (that is to say with the aid of a sequence of the sequentially determined test body distances) specifically, it can be checked whether the criteria are fulfilled as a function of

- a period during which the continuously determined test body distances lie within a defined distance range,
- a sequence of changes in the test body distances as edges which can be detected in the profile of the continuously determined test body distances, and/or a number of changes in the test body distances as edges that can be detected in the profile of the continuously determined test body distances.

In a further specific embodiment, it is possible in this case to provide an additional ultrasonic distance measuring module in the distance measuring device which likewise functions as part of the gesture detector such that the gesture can then once again be additionally verified, in particular the ultrasonic distance measuring module being substantially aligned in the same direction as the laser distance measuring module.

However, the laser distance measuring module can itself advantageously also function at least pro rata as the gesture detector, the latter being designed to continuously determine the test body distances—at least when the gesture measurement triggering mode is switched on—in particular—compared with a measurement mode in which precise determination of the distance relating to the object is performed after measurement triggering—the determination of the test body distances being performed with relatively low accuracy, but in return continuously with a relatively high repetition rate.

In accordance with a further embodiment, it is possible to provide a camera with an image processing unit which can likewise function as an additional part of the gesture detector. In this case, the camera can be designed to take—at least when the gesture measurement triggering mode is switched on—an image or video sequence of the test body, which is guided by the user and executes a movement—intersecting a defined field of view of the camera. With the aid of the image processing unit, the criteria can then be used to detect and identify corresponding gesture patterns and/or test body patterns in the image sequences and/or of the video sequence. In this case, the camera can advantageously be aligned substantially in the same direction as the laser distance measuring module so that a gesture executed at the front, as seen from the distance measuring device, can be detected and identified.

In accordance with a further embodiment, it is also possible to provide a (capacitive or inductive) proximity switch or proximity sensor which (for example together with a proximity sensor output evaluation circuit) additionally forms a part of the gesture detector. In this case, the (capacitive or inductive) proximity sensor (whose basic design is known per se to the person skilled in the art) can be designed according to the invention to detect—at least when the gesture measurement triggering mode is switched on—a test body located within its detection range. In this case, the proximity sensor is arranged in/on the device in such a way, and designed in such a way that its detection range covers the defined desired close range around the distance measuring device. By way of example, if in this case the coded distance measurement triggering gesture is defined as bringing the test body into this determined close range (so that said body also interrupts the measuring light beam),
keeping the test body in the measuring light beam in the close range during a predefined period range (for example for exactly a period between half and one and a half seconds), and
subsequently necessarily removing the test body from the measuring light beam and from the close range, it is then possible, by way of example, to store the following criteria which characterize this gesture:

uninterrupted detection of the test body by the receiver of the laser measuring module or by the proximity sensor during a period of half to one and a half seconds, and subsequently no longer detecting the test body.

These criteria can be checked with the aid of the gesture detector—in the form of the proximity sensor together with a logic evaluating the output of the proximity sensor ("proximity sensor output evaluation circuit"—such as, for example, an evaluation or data processing unit). In this case, as parameters within the meaning of the invention the proximity sensor continuously detects whether the test body is or is not currently present in the defined close range. By evaluating a continuous recording of this proximity sensor output as parameters, the proximity sensor output evaluation circuit can then check whether the stored criteria are (see the above defined criteria, for example) are fulfilled or not, and if they are, a distance measurement can then be immediately triggered automatically.

By way of example, the proximity sensor can be designed (in a way actually known to the person skilled in the art) to detect the presence of a hand as test body, for example within a surrounding area—for example, oriented away from the device from the front side of the distance measuring device—of, for example one to 50 cm in front of the device. As another example, the proximity sensor can also be designed to detect the presence of a small handheld magnet as test body, purely by way of example within a surrounding area—for example oriented away from the device from the top side of the distance measuring device—of, for example, 10 to 45 cm above the device, etc.

Such proximity sensors are already known from other fields of application, for example from cell phone technology where they are used, for example, to detect the proximity of the hand or the ear of a user to the cell phone, and the display illumination is controlled in dependence thereof.

In general, it is possible in this case, purely by way of example, for the following bodies to function as test bodies with the aid of which the distance measurement triggering gesture is to be executed:

a hand of the user,
one or more fingers of a hand of the user,
an arm of the user,
a handheld board or card,
a handheld magnet, and/or
a nonconductor such as, for example, a plastic cube, which has a relatively high dielectric constant.

If a handheld board or card is used as a test body, it is possible in this case for a surface of the board or card having at least partially a high reflectivity or high—compared with the remaining surroundings or a conventional wall surface. Specifically, a surface of the board or card can have a predefined known code pattern composed of regions with a comparatively high reflectivity, and regions with a comparatively low reflectivity, and/or a predefined known code pattern composed of dark and bright and/or differently colored regions.

In addition, it is possible by way of example to define and store criteria which are such as to characterize as the distance measurement triggering gesture a test body movement executed with the aid of the test body with a speed that is within a defined speed range,
at a distance within the defined close range, in particular between 5 and 100 cm, specifically between 10 and 50 cm,
for a period lasting within a defined period range, and/or within a defined area of the field of view from the distance measuring device.

By means of such a measurement triggering functionality lacking contact with the device housing it is advantageously possible to avoid inadvertently changing the alignment of the device during the process of triggering the measurement operation. This has an advantageous effect on the measuring accuracy, and contributes to the avoidance of faulty measurements.

The invention is explained below once more in other words,

The inventive electro-optical, in particular handheld distance measuring device can thus have at least a measuring device housing, an optical transmission path (assigned to the distance measuring unit), having at least one optical transmitter for emitting an optical measuring light beam in the direction of an object and an optical reception path (assigned to the distance measuring unit), with a reception optics for focusing reflected components of the optical measuring light beam in a direction of a receiver.

In addition, in accordance with an advantageous embodiment it is possible—as already explained at the beginning in a similar way—for the electro-optical measuring device to have a test signal wave transmission path (functionally associated with the gesture detector) with at least one transmitter for emitting test signal waves, and a test signal wave reception path (functionally associated with the gesture detector) with at least one detector for detecting reflected components of the emitted test signal waves. Furthermore, according to the invention the electro-optical measuring device is equipped with a functionality for triggering an electro-optical distance measurement in the context of which a precise distance measurement is triggered when the test signal wave transmission path is interrupted in a close range of the electro-optical distance measuring device, preferably within a distance of between 1 cm and 100 cm from the electro-optical distance measuring device, during a short defined period, for example for a period lying between about a tenth of a second and about a half or three quarters of a second. The interruption can take place by guiding the test body (as, for example, by a hand of the user, also sometimes referred to below as a target) through the test signal wave transmission path, that is to say such that the test body intersects the test signal wave transmission path.

In order to detect an interruption of the test wave transmission path, reflected components of the test waves are measured at a high frequency, for example in a cycle of 100 ms. In this case, two different measurement methods are provided in this case for detecting the interruption.

For example, it is possible in this case for a measurement method to be based on a measurement of the intensity of the reflected components of the test waves. The electro-optical distance measurement is triggered in the case of determination of a large change in intensity, for example of the order of magnitude of more than 10%, in particular for more than 50%. This method is typically advantageous whenever the reflection signals differ strongly from one another in the presence and absence of the target.

A further alternative exemplary measurement method can also be based on a measurement of the distance in relation to the target. When the stipulated distance is lower than a prescribed threshold value, for example less than 1 m, the electro-optical distance measurement is triggered again. In the context of this second measurement method for detecting an interruption of the test wave transmission path, no high resolution is required for the distance measurement—rather, a coarse measurement is sufficient. This second measurement method can above all be used advantageously when the reflection signals exhibit only slight differences in the presence and absence of the test body or target.

These two described measurement methods can be used as an alternative to one another or—in order to increase the robustness of the detection and identification of the known measurement triggering gesture, which can be characterized with the aid of the criteria can also be used in combination.

By means of such a measurement triggering functionality lacking contact with the device housing it is advantageously possible to avoid inadvertently changing the alignment of the device during the process of triggering the measurement operation. This has an advantageous effect on the measuring accuracy, and contributes to the avoidance of faulty measurements.

There are various embodiment options with reference to the geometry of the design of optical transmission path and test signal wave transmission path and the associated reception paths, which are typically arranged with the lateral spacing in relation to the associated transmission paths.

Optical transmission path and test signal wave transmission path can be arranged in a different direction to one another, for example the optical transmission path starting from an end face, and the test signal wave transmission path starting from a side face of the electro-optical measuring device.

It may be regarded as more economic, and therefore advantageous, for a user when the optical transmission path and the test signal wave transmission path are aligned parallel to one another, in particular in the same direction.

The test signal waves are optical waves, that is to say light waves, in particular in the visible or near infrared wavelength region which are emitted by the laser source of the laser distance measuring module such that the optical transmission path and the test signal wave transmission path as well as the optical reception path and the test signal wave reception path are therefore respectively mutually identical. This enables the use of only one optical transmitter and only one reception optics with a receiver, thus advantageously reducing the resulting complexity and required overall size of the inventive electro-optical measuring device.

As further test signal waves, acoustic waves can also additionally be emitted by an acoustic transmitter, in particular ultrasound waves, and received by an acoustic detector.

A particular embodiment of the inventive electro-optical measuring device is characterized in that the functionality for triggering an electro-optical distance measurement by means of temporarily resolved and/or spatially resolved detection of patterns of higher and lower intensity of test signal waves reflected in the close range of the electro-optical measuring device and processing them in an evaluation and control unit of the electro-optical measuring device enables different control commands in addition to those for triggering a distance measurement to be carried out as a function of a detected pattern.

In accordance with this embodiment of the inventive measurement method, it is possible, for example, for the patterns of higher and lower intensity of test signal waves reflected in the close range of the electro-optical measuring device to be produced via the test signal wave transmission path by movement of a hand, as test body or target, with fingers completely or partially spread.

Such patterns of higher and lower intensity of test signal waves reflected in the close range of the electro-optical measuring device can also be produced via the test signal wave transmission path by moving a carrier (for example handheld board or handheld card) as target on which there is applied a relief, color or light/dark coding.

Based on the technical teaching described above—in conjunction with the inventive distance measuring device—, the invention also further relates to an electro-optical distance measurement method by means of a distance measuring device, in particular by means of a handheld laser distance measuring device comprising at least triggering of a distance measuring operation, and automatically conducting an execution of the distance measuring operation in response to the triggering by emitting an optical measuring light beam in the direction of an object and detecting reflected components of the optical measuring light beam, and determining the distance relating to the object on the basis of the received components of the optical measuring light beam.

According to the invention, in this case there are now defined and stored in turn criteria which are such as to characterize a stipulated distance measurement triggering gesture made by a user to cross the measuring light beam in an encoded fashion with the aid of a test body.

In addition, in accordance with the core of the invention in the context of a gesture measurement triggering mode reflected components of the optical measuring light beam are continuously detected at a defined minimum rate, the continuously detected reflected components of the optical measuring light beam are evaluated with regards to parameters that are dependent on a gesture crossing the measuring light beam in an encoded fashion with the aid of the test body, with the aid of the parameters it is checked as to whether they correspond to the defined criteria and—in the event of correspondence the criteria—with the gesture made by the user as the distance measurement triggering gesture is identified, and the distance measurement operation is triggered upon identification of the distance measurement triggering gesture.

In this case, the features which have already previously developed the inventive distance measuring device and/or described it in more detail, for example can likewise be applied by analogy to the inventive distance measurement method, and can therefore also be used by analogy to develop the inventive distance measurement method or specify it in more detail.

A further object of the invention—which again picks up the core idea of the inventive teaching in a similar way to before—is a computer program product with program code which is stored on a machine readable carrier, in which criteria are defined and stored which are such as to characterize a stipulated distance measurement triggering gesture made by a user to cross the measuring light beam in an encoded fashion with the aid of a test body and in which the computer program product is designed with the program code for controlling and carrying out the following steps of the abovementioned distance measurement method according to the invention:

evaluation of the continuously detected reflected components of the optical measuring light beam with regards to parameters that are dependent on a gesture crossing the measuring light beam in an encoded fashion with the aid of the test body, using the parameters to check whether these correspond to the defined criteria and—in the event of correspondence with the criteria—identifying the gestures made by the user as the distance measurement triggering gesture, and triggering the distance measurement operation upon identification of the distance measurement triggering gesture, in particular when the program is executed on an electronic data processing unit designed as an evaluation and control unit of the distance measuring device according to one of the abovenamed embodiments.

BRIEF DESCRIPTION OF THE DRAWINGS

Purely by way of example, the inventive device is described in more detail below with the aid of concrete exemplary embodiments illustrated schematically in the drawings, and also being a detailed look at further advantages of the invention. In detail:

FIGS. 3$a$-3$c$ illustrate a handheld laser distance measuring device as an example of an inventive electro-optical distance measuring device, and the inventive measurement method which can be executed thereby;

DETAILED DESCRIPTION

Figure 1:
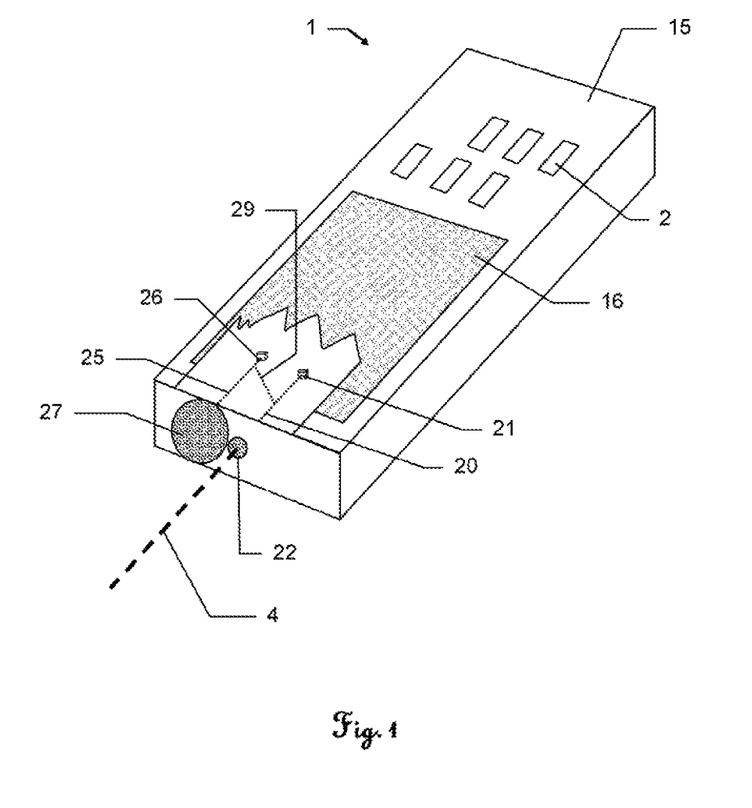
FIG. 1 illustrates a handheld laser distance measuring device according to the prior art.

FIG. 1 shows an electro-optical measuring device 1 embodied as a handheld laser distance measuring device that can be mounted on a suitable (small) tripod. Said measuring device has a housing 15 and actuators 2 for switching the distance measuring device on and off, and for starting and/or configuring a measurement operation. In addition to the actuators 12, the measuring device 1 has a display 16 for reproducing measurement results and details of the device status. As indicated schematically and in principle, the device has a transmission path 20 with a transmitter 21 for emitting optical measuring beams 4, and an exit window 22 for the measuring beams 4, as well as a reception path 25 with a receiver 26 and a reception optics 27.

The transmitter 21, the exit window 22, the receiver 26 and the reception optics 27 are fastened inside the housing on an optics carrier (not explicitly illustrated so as to facilitate recognition). Here, the optics carrier is situated in the housing 5 such that the exit window 22 and the reception optics 27 are respectively arranged behind openings in the housing 15.

In this case, the optics carrier can have a—for example cylindrically shaped—transmission channel between the transmitter and exit window 22, and a reception channel between the reception optics 27 and receiver, it being possible, if appropriate, to arrange a deflecting means in the reception channel in order to deflect the received beam onto the receiver. In addition, the optics carrier can be designed such that some of the transmitted beams are directed onto the receiver as reference beams 29 before exiting from the device.

The measurement of distances is performed in accordance with principles known from the prior art such as, for example, the pulse propagation time principle or phase comparison principle.

The laser rangefinder can, moreover, have further components and/or functions which are known from the prior art and are conventional there.

Figure 2:
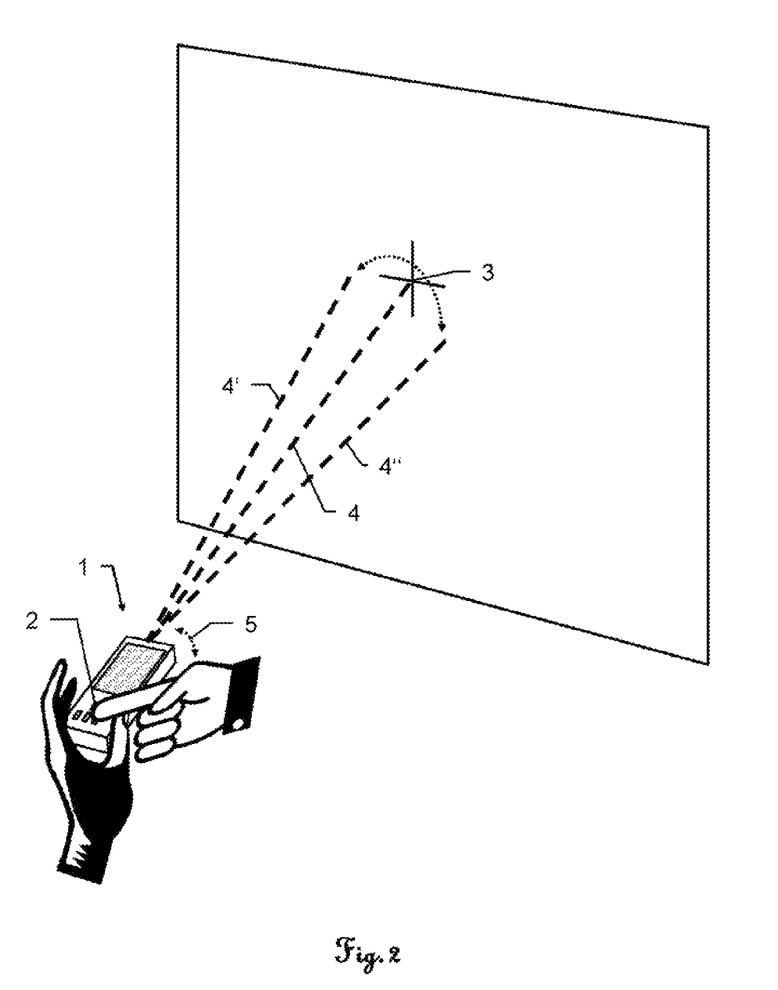
FIG. 2 illustrates the laser distance measuring device according to FIG. 1 in an exemplary application.

FIG. 2 shows the laser distance measuring device according to FIG. 1 as applied in a measurement. The laser distance measuring device 1 emits a laser beam 4 in the direction of a point in space 3 to be measured. Arranged on the laser distance measuring device 1 is an input key 2 which a user can actuate to trigger a distance measurement relating to the point in space 3.

Owing to the triggering of the measurement by this mechanical command input, there can easily be an unintended adjustment of the measuring device from an originally provided aiming direction, this being indicated by the double arrow 5. The result of this is that, depending on distance, the alignment of the laser beam 4 is shifted away significantly from the previously targeted point in space 3 in the direction of laser beams 4', 4", for example of the order of magnitude of several centimeters, and this also leads to inaccurate results with reference to the actual distance measurement.

Figure 3A:
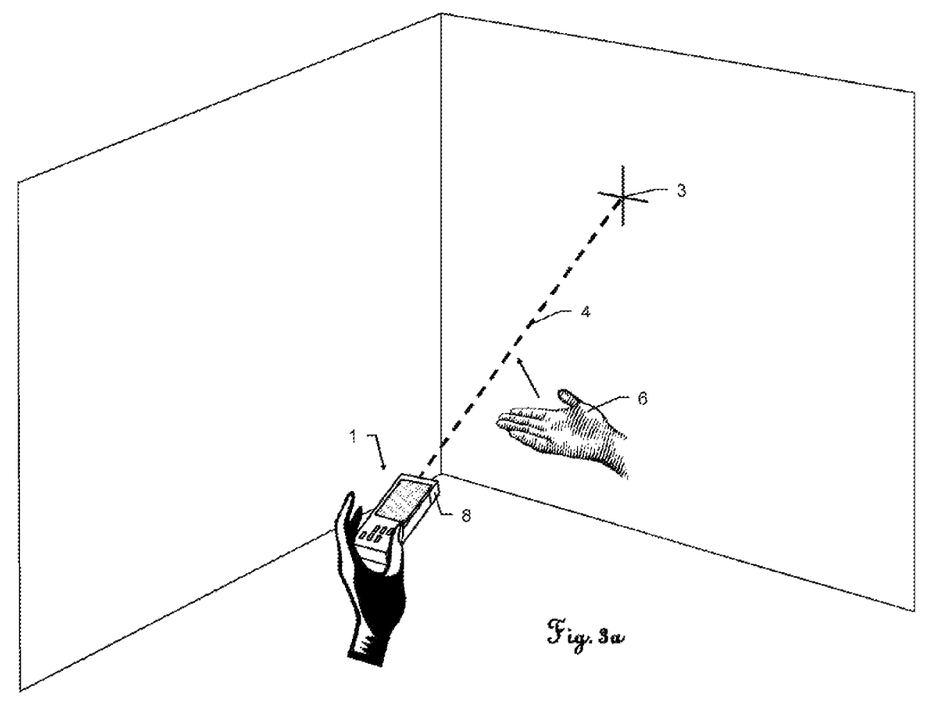
Figure 3B:
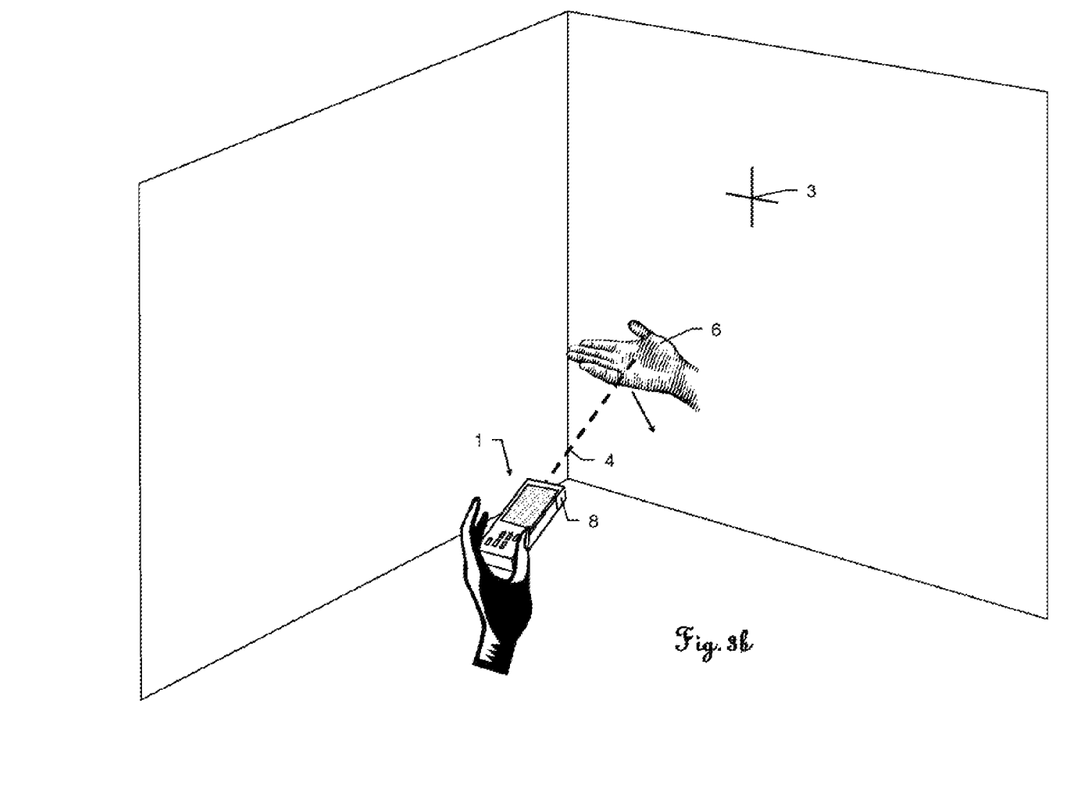
Figure 3E:
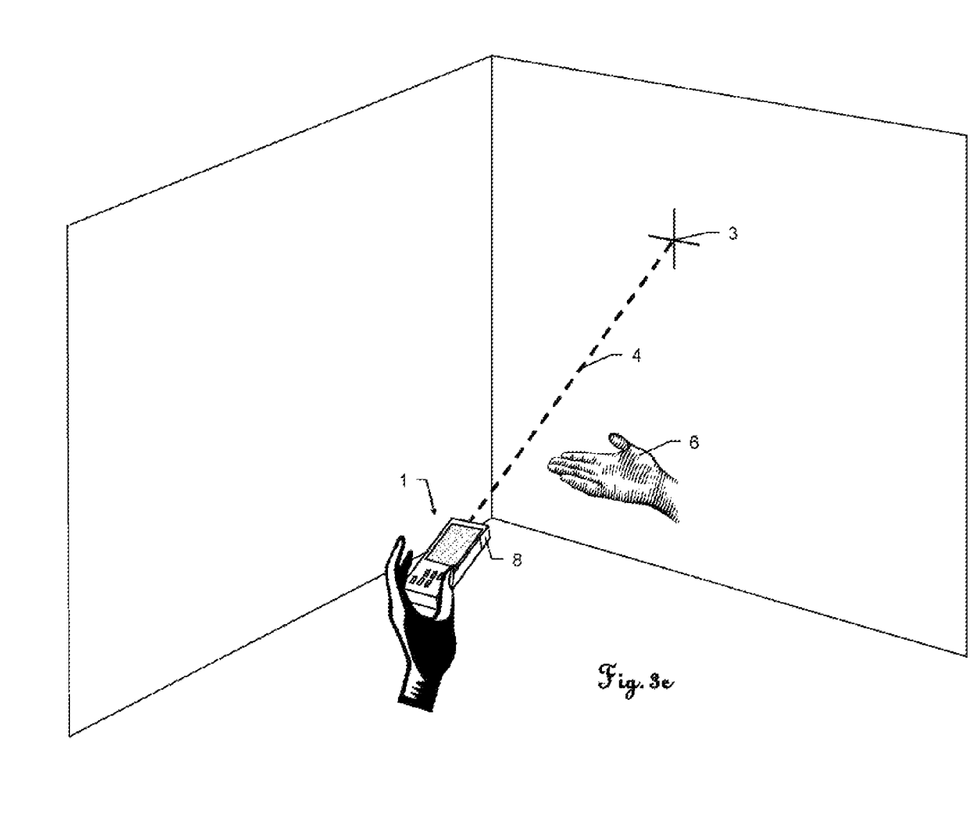

FIGS. 3a to 3c illustrate a preferred embodiment of the invention for overcoming this problem, in accordance with which the optical transmission path and the test signal wave transmission path as well as the optical reception path and the test signal wave reception path are respectively mutually identical so that in this exemplary embodiment the EDM module (distance measuring module of the device 1) itself functions as an essential component of the gesture detector 8. In this case, it is only the laser beam 4 emitted by the laser distance measuring device 1 in the direction of the point in space 3 that is illustrated. As illustrated in FIG. 3b, in order to trigger a distance measurement a hand as an example of a test body 6 is guided through the test signal wave transmission path, which in this example is identical to the optical transmission path, that is to say laser beam 4, with the result that at the location of the hand that is guided through the propagation of the laser light in the direction of the point in space 3, for example at a distance of 10 cm to 50 cm from the laser distance measuring device 1, is interrupted for a short time, typically for fractions of a second, until the hand as test body 6 is once again guided out of the laser beam 4.

In order to detect an interruption of the test wave transmission path, which is identical in this case with the optical transmission path (laser beam 4), reflected components of the test waves are measured at a high frequency, for example in a cycle of 100 ms. In this case, two different measurement methods are provided for detecting the interruption.

The first measurement method is based on a measurement of the intensity of the reflected components of the test waves. When a large change in intensity is being determined, the electro-optical distance measurement is triggered within a short period after the interruption of the transmitted beam, for example after half a second. This method is typically advantageous whenever the reflection signals differ strongly from another in the presence and absence of the test body 6.

The second measurement method is based on a measurement of the distance in relation to the test body 6. When the stipulated distance is lower than a prescribed threshold value, for example less than 1 m, the electro-optical distance measurement is triggered again. In the context of this second measurement method for detecting an interruption of the test wave transmission path, no high resolution is required for the distance measurement—rather a coarse measurement is sufficient. This second measurement method can above all be used advantageously when the reflection signals exhibit only slight differences in the presence and absence of the test body 6.

The first and the second measurement method can be used as alternatives to one another, or else in combination.

By means of this invention, illustrated with the aid of FIGS. 3a to 3c, and its development, it is advantageously possible to avoid an unintended change in the alignment of the measuring device (which would imply an undesired change in the target position under aim) during the process of triggering the measurement operation without being in contact with the measuring device housing. This has an advantageous effect on the measuring accuracy and contributes to the avoidance of faulty measurements.

Figure 4:
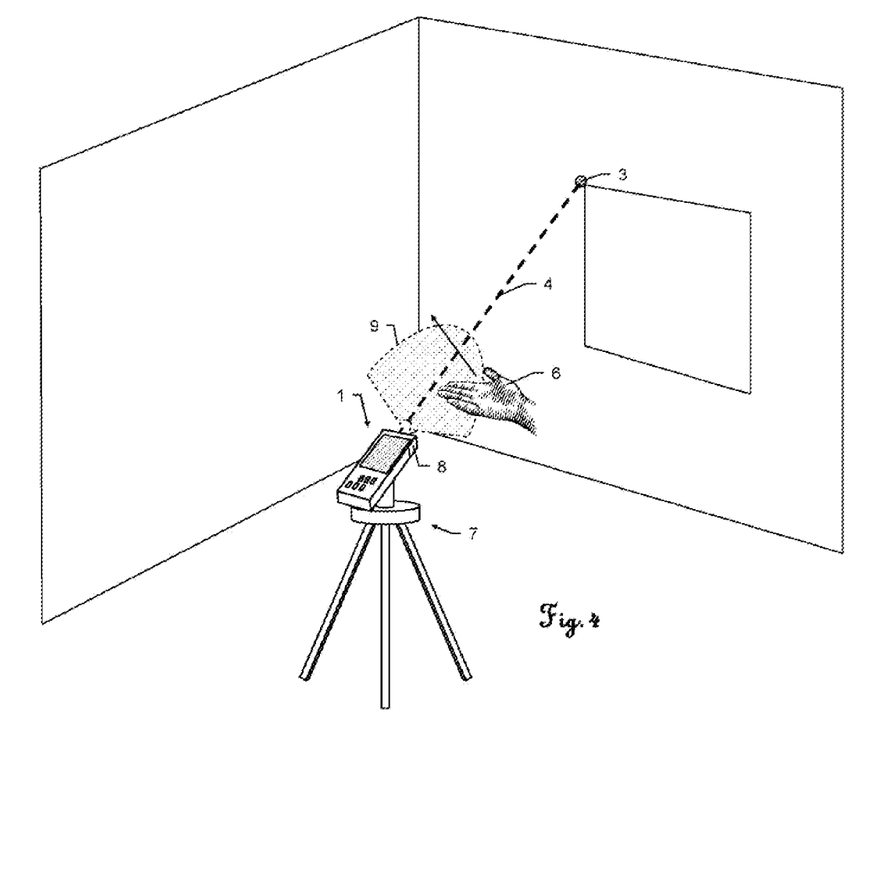
FIG. 4 illustrates a further example of an inventive distance measuring device, designed as an handheld laser distance measuring device, when in use on a tripod.

FIG. 4 shows a further exemplary embodiment of a distance measuring device—inventively equipped with a gesture detector 8 and having a measurement triggering functionality provided without being in contact with the measuring device—which is designed as a handheld laser distance measuring device and mounted on a tripod 7. In this case, the tripod can be designed as a floor tripod in a known way—for example, from the field of interior surveying—, or alternatively as a small table tripod in a known way—for example from the field of cameras.

Owing to the provision of triggering, performed inventively without contact with the measuring device, of a distance measurement, the user is able with high precision to align the laser distance measuring device mounted on the tripod with the desired measurement point 3 with the aid of the laser beam 4 of said device, and to trigger a measurement by executing the stipulated gesture (for example with his hand as test body 6) in the close range 9 of the device 1, without the need in this case to accept renewed contact with the measuring device or to accept an otherwise undesired misalignment shortly before the actual measurement. However, for the purpose of triggering a measurement operation, it is therefore possible in accordance with the invention to dispense with the remote operation by radio or Bluetooth that is otherwise known from the prior art and executed separately in physical terms, but is complicated both structurally and on the operating side.

It goes without saying that the present illustrated figures are merely schematics of possible exemplary embodiments. According to the invention, the various approaches can be combined with one another and with devices of the prior art.

What is claimed is:

1. An electro-optical distance measuring device for contactless distance measurement, comprising:
    a laser distance measuring module that has a laser source for emitting an optical measuring light beam in the direction of an object;
    a receiver for detecting reflected components of the optical measuring light beam; and
    an evaluation and control unit for determining a distance on the basis of the received components of the optical measuring light beam, wherein:
        criteria are defined and stored which characterize a stipulated distance measurement triggering gesture made by a user to cross the measuring light beam in an encoded fashion with the aid of a test body; and
        the evaluation and control unit is designed to execute a gesture measurement triggering mode in which the detection of reflected components of the optical measuring light beam is performed automatically and continuously at a defined minimum rate by the receiver; and
        the evaluation and control unit automatically:
            evaluates the continuously detected reflected components of the optical measuring light beam with regards to parameters that are dependent on a gesture crossing the measuring light beam in an encoded fashion with the aid of the test body;
            uses the parameters to check whether these correspond to the defined criteria and, in the event of correspondence with the criteria, the gesture made by the user is identified as the distance measurement triggering gesture; and
            triggers a distance measurement relating to the object in response to an identification of the distance measurement triggering gesture.

2. The distance measuring device as claimed in claim 1, wherein the evaluation and control unit is designed to execute the gesture measurement triggering mode in such a way that whether the criteria are fulfilled is checked as a function of a profile of an intensity, and/or of a profile of a change in intensity of continuously detected reflected components of the optical measuring light beam, specifically whether the criteria are fulfilled being checked as a function of at least one of:
- a period during which the intensity lies within a defined intensity window;
- a sequence of changes in intensity as edges detectable in the intensity profile; and
- a number of change in intensity as edges detectable in the intensity profile.

3. The distance measuring device as claimed in claim 1, wherein the evaluation and control unit is designed to execute the gesture measurement triggering mode in such a way that with the aid of the continuously detected reflected components of the optical measuring light beam the evaluation and control unit automatically determines a sequence of test body distances relating to the test body crossing the measuring light beam, and whether the criteria are fulfilled is checked with the aid of the sequence of test body distances.

4. The distance measuring device as claimed in claim 3, wherein, whether the criteria are fulfilled is checked as a function of at least one of:
- a period during which a group of directly sequential test body distances from the sequence of test body distances lie within a defined distance range;
- a sequence of changes in respective test body distances among one another from the sequence as edges detectable in the sequence of test body distances; and
- a number of changes, identifiable as decisive, in test body distances from the sequence as edges detectable in the profile of the continuously determined test body distances.

5. The distance measuring device as claimed in claim 3, wherein the evaluation and control unit is designed to execute the gesture measurement triggering mode in such a way that, compared with a measurement mode in which precise determination of the distance relating to the object is performed after measurement triggering, the test body distances of the sequence of test body distances are determined with relatively low accuracy, but, in return, continuously with a relatively high repetition rate.

6. The distance measuring device as claimed in claim 1, further comprising a camera with an image processing unit, the camera being designed to take an image or video sequence of the test body at least when the gesture measurement triggering mode is switched on, which is guided by the user and executes a movement intersecting a defined field of view of the camera; and
- the image processing unit being designed to detect gesture pattern corresponding to the criteria and/or test body pattern in the image sequence or the video sequence so that on the basis thereof it can additionally be checked whether the stored criteria are fulfilled or not by the detected gesture patterns and/or test body patterns, and in the case of fulfillment of the criteria the gesture executed by the user can additionally be verified as the distance measurement triggering gesture.

7. The distance measuring device as claimed in claim 6, wherein the camera is aligned substantially in the same direction as the laser distance measuring module.

8. The distance measuring device as claimed in claim 1, further comprising a capacitive or inductive proximity sensor with a proximity sensor output evaluation circuit, the proximity sensor being designed to continuously detect, at least when the gesture measurement triggering mode is switched on whether the test body is or is not located in the detection range of the proximity sensor as the parameters, the proximity sensor being arranged and designed in such a way that its detection range covers the defined desired close range around the distance measuring device; and
- the proximity sensor output evaluation circuit being designed to evaluate the results of the continuous detection and to use these results to additionally conduct a check as to whether the stored criteria are fulfilled or not so that in the case of fulfillment of the criteria the gesture executed by the user can additionally be verified as the distance measurement triggering gesture.

9. The distance measuring device as claimed in claim 1, wherein criteria are defined and stored which are such as to characterize a distance measurement triggering gesture executed by, as the test body:
- a hand of the user;
- one or more fingers of a hand of the user;
- an arm of the user; and/or
- by a handheld board or card.

10. The distance measuring device as claimed in claim 1, wherein criteria are defined and stored which are such as to characterize a distance measurement triggering gesture executed by, as the test body:
- by a handheld board or a handheld card at least partially with a surface having a predefined known code pattern:
  - composed of regions of comparatively high reflectivity and regions of comparatively low reflectivity; or
  - composed of comparatively dark, bright and/or differently colored regions.

11. The distance measuring device as claimed in claim 1, wherein criteria are defined and stored which are such as to characterize as the distance measurement triggering gesture test body movement on which intersects the measuring light beam and is executed by the test body according to at least one of the following:
- with a speed that is within a defined speed range;
- at a distance within a defined close range about the distance measuring device between 5 and 100 cm;
- for a period lasting within a defined period range; and
- within a defined area of the field of view from the distance measuring device.

12. The distance measuring device as claimed in claim 1, wherein in response to the identification of the distance measurement triggering gesture the distant measurement relating to the object:
- is triggered and carried out automatically in a standard mode by the evaluation and control unit with a delay of approximately between a quarter and a whole second; and/or
- is triggered and carried out by the evaluation and control unit automatically in a trigger delay mode with a defined time delay of between five and fifteen seconds.

13. The distance measuring device as claimed in claim 1, wherein the distance measuring device is a handheld laser distance measuring device.

14. The distance measuring device as claimed in claim 1, wherein in response to the identification of the distance measurement triggering gesture the distant measurement relating to the object is triggered and carried out automatically in a standard mode by the evaluation and control unit with a delay of approximately half a second.

15. An electrode-optical distance measurement method by means of a distance measuring device by means of a handheld laser distance measuring device, comprising:
- triggering of a distance measuring operation; and
- automatically conducting an execution of the distance measuring operation in response to the triggering by:

emitting an optical measuring light beam in the direction of an object and detecting reflected components of the optical measuring light beam; and determining the distance relating to the object on the basis of the received components of the optical measuring light beam, wherein:

criteria are defined and stored which are such as to characterize a stipulated distance measurement triggering gesture made by a user to cross the measuring light beam in an encoded fashion with the aid of a test body; and within the context of a gesture measurement triggering mode:

reflected components of the optical measuring light beam are continuously detected at a defined minimum rate;

the continuously detected reflected components of the optical measuring light beam are evaluated with regards to parameters that are dependent on a gesture crossing the measuring light beam in an encoded fashion with the aid of the test body, the parameters are used to check whether these correspond to the defined criteria and, in the event of correspondence with the criteria, the gesture made by the user is identified as the distance measurement triggering gesture; and triggering is conducted upon identification of the distance measurement triggering gesture.

16. The distance measurement method as claimed in claim 15, wherein whether the criteria are fulfilled is checked as a function of a profile of an intensity, and/or of a profile of a change in intensity of continuously detected reflected components of the optical measuring light beam, and whether the criteria are fulfilled being checked as a function of:

a period during which the intensity lies within a defined intensity window;

a sequence of changes in intensity as edges detectable in the intensity profile; and/or a number of change in intensity as edges detectable in the intensity profile.

17. The distance measurement method as claimed in claim 15, wherein with the aid of the continuously detected reflected components of the optical measuring light beam a sequence of test body distances relating to the test body crossing the measuring light beam are determined, and whether the criteria are fulfilled is checked with the aid of the sequence of test body distances.

18. The distance measurement method as claimed in claim 17, wherein whether the criteria are fulfilled being checked as a function of at least one of:

a period during which a group of directly sequential test body distances from the sequence of test body distances lie within a defined distance range;

a sequence of changes in respective test body distances among one another from the sequence as edges detectable in the sequence of test body distances; and a number of changes, identifiable as decisive, in test body distances from the sequence as edges detectable in the profile of the continuously determined test body distances.

19. The distance measurement method as claimed in claim 15, wherein compared with a measurement mode in which precise determination of the distance relating to the object is performed after measurement triggering, the test body distances of the sequence of test body distances are determined with relatively low accuracy, but, in return, continuously with a relatively high repetition rate.

20. A computer program product with program code which is stored on a non-transitory machine readable medium, in which criteria are defined and stored which are to characterize a stipulated distance measurement triggering gesture made by a user to cross the measuring light beam in an encoded fashion with the aid of a test body, and in which the computer program product with the program code is designed to control and carry out the following steps of the distance measurement method as claimed in claim 15:

evaluation of the continuously detected reflected components of the optical measuring light beam with regards to parameters that are dependent on a gesture crossing the measuring light beam in an encoded fashion with the aid of the test body;

using the parameters to check whether these correspond to the defined criteria and, in the event of correspondence with the criteria, identifying the gesture made by the user as the distance measurement triggering gesture; and triggering the distance measurement operation upon identification of the distance measurement triggering gesture.

* * * * *